United States Patent [10] Patent No.: US 10,846,748 B2
Shrivastava et al. (45) Date of Patent: Nov. 24, 2020

(54) ONBOARDING FEATURE CUES

(71) Applicant: Yahoo!, Inc., Sunnyvale, CA (US)

(72) Inventors: Utkarsh Shrivastava, Sunnyvale, CA (US); Mark Nachazel, San Jose, CA (US); Murali Krishna Bachhu, Sunnyvale, CA (US); Christopher Scot Royer, San Jose, CA (US); Keren Kochava Baruch, San Francisco, CA (US); Friedhold Alexander Seyfert, San Francisco, CA (US)

(73) Assignee: Oath Inc., New York, NY (US)

( * ) Notice: Subject to any disclaimer, the term of this patent is extended or adjusted under 35 U.S.C. 154(b) by 813 days.

(21) Appl. No.: 14/954,010

(22) Filed: Nov. 30, 2015

(65) Prior Publication Data
US 2017/0154360 A1 Jun. 1, 2017

(51) Int. Cl.
G06Q 30/00 (2012.01)
G06Q 30/02 (2012.01)

(52) U.S. Cl.
CPC ..... G06Q 30/0264 (2013.01); G06Q 30/0255 (2013.01)

(58) Field of Classification Search
None
See application file for complete search history.

(56) References Cited

U.S. PATENT DOCUMENTS

| | | | | |
|---|---|---|---|---|
| 2006/0224693 A1* | 10/2006 | Gaidemak | ............... | G06F 15/16 709/217 |
| 2013/0304587 A1* | 11/2013 | Ralston | .............. | G06Q 30/0271 705/14.67 |
| 2015/0088911 A1* | 3/2015 | Qiao | ...................... | G06Q 30/00 707/749 |
| 2016/0011752 A1* | 1/2016 | Subramanian | ............ | G06F 8/61 715/747 |
| 2016/0148271 A1* | 5/2016 | Sinha | ................. | G06Q 30/0269 705/14.66 |

OTHER PUBLICATIONS

Sarah Perez, App Release Notes Are Getting Stupid, Sep. 4, 2015, TechCrunch.com (Year: 2015).*

* cited by examiner

Primary Examiner — Naresh Vig
(74) Attorney, Agent, or Firm — Cooper Legal Group, LLC

(57) ABSTRACT

One or more client devices, systems, and/or methods for onboarding feature cues for a product are provided. A feature cue and an existing feature cue, comprising eligible feature cues (e.g., feature cues that a user has not viewed, are relevant to the user, etc.), are provided to a dispatching component (e.g., configured to provide feature cues to users). A presentation hierarchy, of the feature cue and the existing feature cue, is determined based upon feature cue rules and user parameters. The feature cue, having a first hierarchical position in the presentation hierarchy, is presented to the user, through a client device hosting the product, at a first time. The existing feature cue, having a second hierarchical position in the presentation hierarchy, is presented to the user, through the client device, at a second time, where the first time and the second time are determined by the feature cue rules.

20 Claims, 9 Drawing Sheets

ONBOARDING FEATURE CUES

BACKGROUND

Product providers may desire to alert users about current features and/or new features of a product (e.g., an email application, a social network application, a photo sharing service, a website, etc.). For example, a webmail product may have three new and/or existing features (e.g., an emoji feature, a keyword search feature, and an archiving feature). Three feature cues (e.g., three instructions indicating to a user that the three features are available) may be created and presented to the user. Unfortunately, the three feature cues may be presented simultaneously to the user (e.g., overwhelming the user), an irrelevant feature cue may be presented to the user (e.g., the user may already be utilizing the three features), and/or a feature cue may be presented to the user after a feature, associated with the feature cue, is well known. In another example, related feature cues may be presented to the user in a haphazard manner. Thus, users may be provided with irrelevant feature cues and/or may be overwhelmed with multiple and/or unrelated feature cues. Unfortunately, many computing devices, systems, etc., may not have an ability to organize and coordinate feature cues and/or identify relevant feature cues for the user.

SUMMARY

In accordance with the present disclosure, one or more client devices, systems, and/or methods for onboarding feature cues are provided. In an example, a feature cue (e.g., an indication presented to a user that a feature has been added to a product) may be generated utilizing a feature cue template (e.g., comprising a default set of parameters and/or design guidelines, such as size, shape, color, and/or other parameters). The feature cue for the product may be provided to a scheduling component. The scheduling component may comprise an existing feature cue for the product. An eligibility of the feature cue and the existing feature cue may be determined. The feature cue may be determined to comprise an eligible feature cue based upon the user having not previously viewed the feature cue, the user having viewed the feature cue for an a time below a sufficient time threshold, and/or the user having failed to utilize the feature corresponding to the feature cue. The feature cue may be determined to comprise an ineligible feature cue based upon the user having utilized the feature corresponding to the feature cue, the user having interacted with the feature cue for a time exceeding the sufficient time threshold, and/or the feature cue having reached an end of life date. Responsive to the feature cue being relevant to a second product in a product family comprising the product, the eligibility of the feature cue may be based upon a user interaction with the feature cue while using the second product.

Responsive to the feature cue and the existing feature cue comprising eligible feature cues, the feature cue and the existing feature cue may be provided to a dispatching component. In an example, the dispatching component may be configured to dispatch one or more feature cues to the user, such as by displaying the feature cues while the user is interacting with the product. Responsive to the feature cue and the existing feature cue comprising ineligible feature cues, the feature cue and the existing feature cue may be removed from the scheduling component. A presentation hierarchy of the feature cue and the existing feature cue may be determined based upon feature cue rules and user parameters. A second presentation hierarchy of the feature cue and the existing feature cue (e.g., an alternate hierarchical organization of feature cues) may be determined based upon the feature cue rules and the user parameters. In an example, the feature cue rules may comprise an assignment of a duration minimum between presentations of feature cues, an instruction for simultaneous presentations of feature cues, a coordination between related feature cues, and/or a maximum number of feature cues shown in a time period. In an example, the user parameters may comprise an interaction of the user with the product, an interaction of the user with past feature cues, a user demographic of the user, a user behavior of the user, a feature of the product with which the user interacts, and/or a second feature of a related product with which the user interacts.

The presentation hierarchy and/or the user parameters may be based upon a user engagement metric. The user engagement metric may correspond to user interaction with the feature cue and/or user interaction with the feature described by the feature cue. The feature cue may be altered based upon the user satisfaction metric. The feature cue may be presented to the user in response to identifying a targeting action of the user (e.g., the user interacting with the feature related to the feature cue). In an example, the targeting action (e.g., the user utilizing a type specific keyword) may be comprised in the presentation hierarchy. For example, the user initiating the targeting action may advance a targeted feature cue corresponding to the targeting action to a first hierarchical position in the presentation hierarchy. The targeting action may be altered based upon the user engagement metric corresponding to the user interaction or lack thereof with the feature cue.

Responsive to the feature cue having the first hierarchical position in the presentation hierarchy, the feature cue may be presented to the user, through a client device hosting the product, at a first time. Responsive to the existing feature cue having a second hierarchical position in the presentation hierarchy, the existing feature cue may be presented to the user, through the client device, at a second time. The first time and the second time may be determined by the feature cue rules. In an example, responsive to the second presentation hierarchy having a higher user engagement metric (e.g., as determined by a second user of a second client device hosting the product) as compared to the presentation hierarchy, the second presentation hierarchy, but not the presentation hierarchy, may be designated for subsequent presentation to users.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
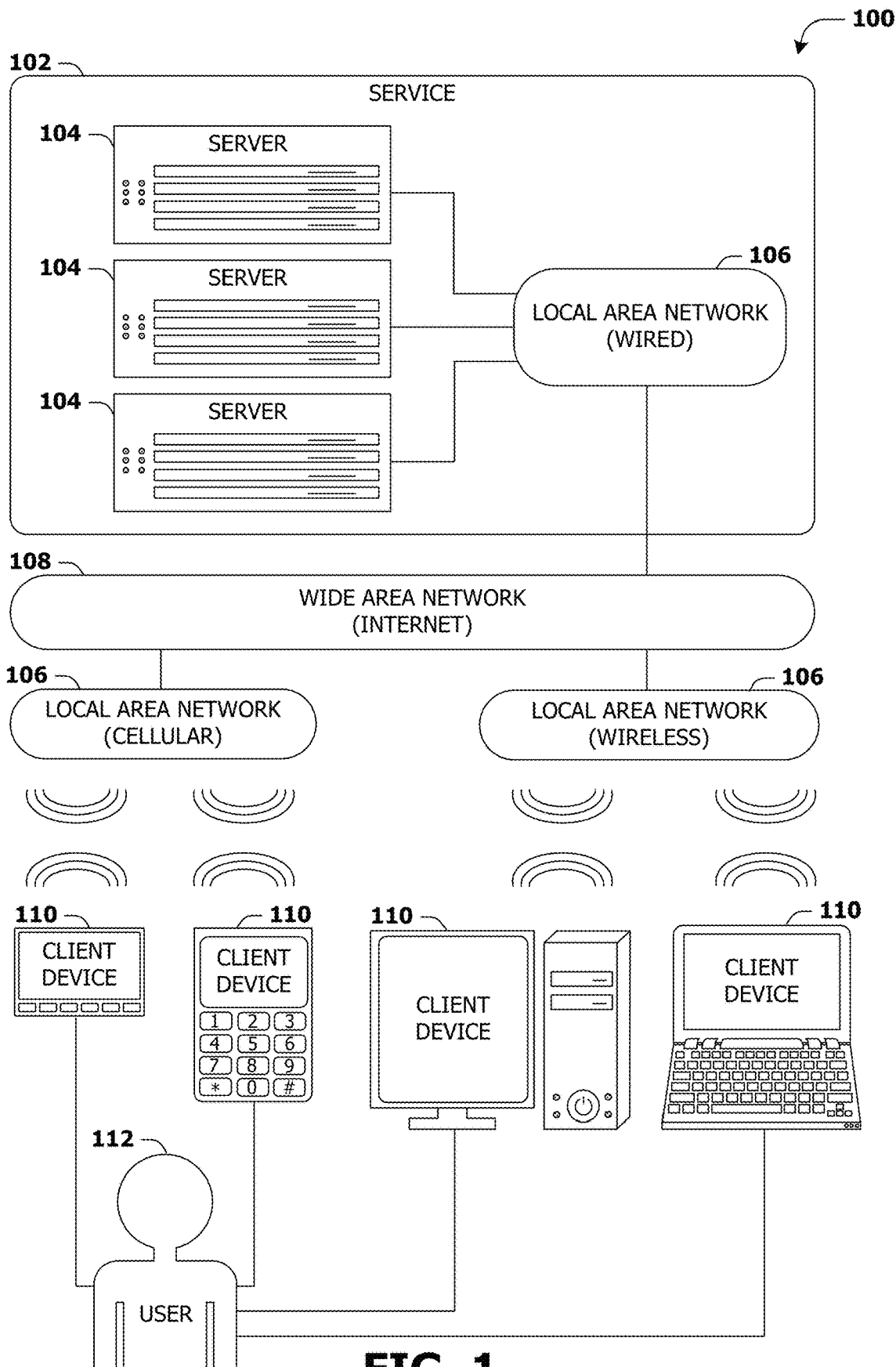
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
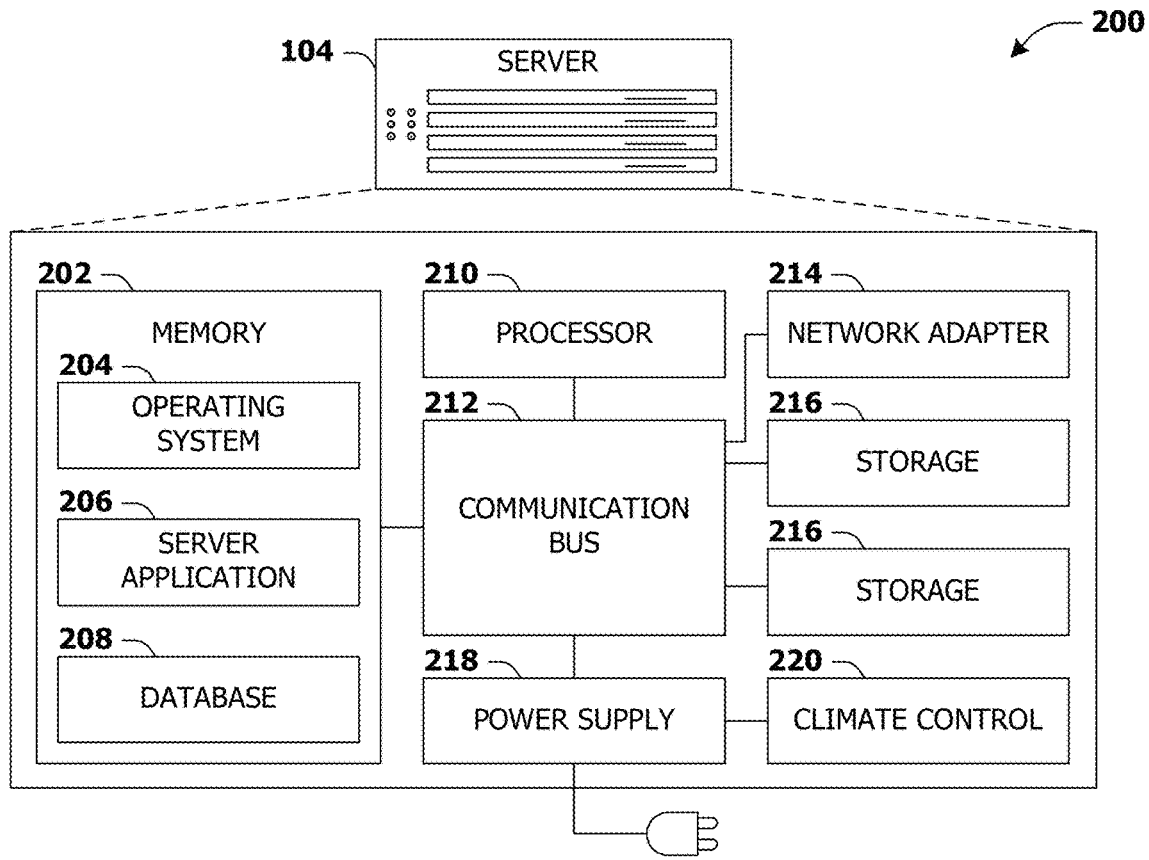
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
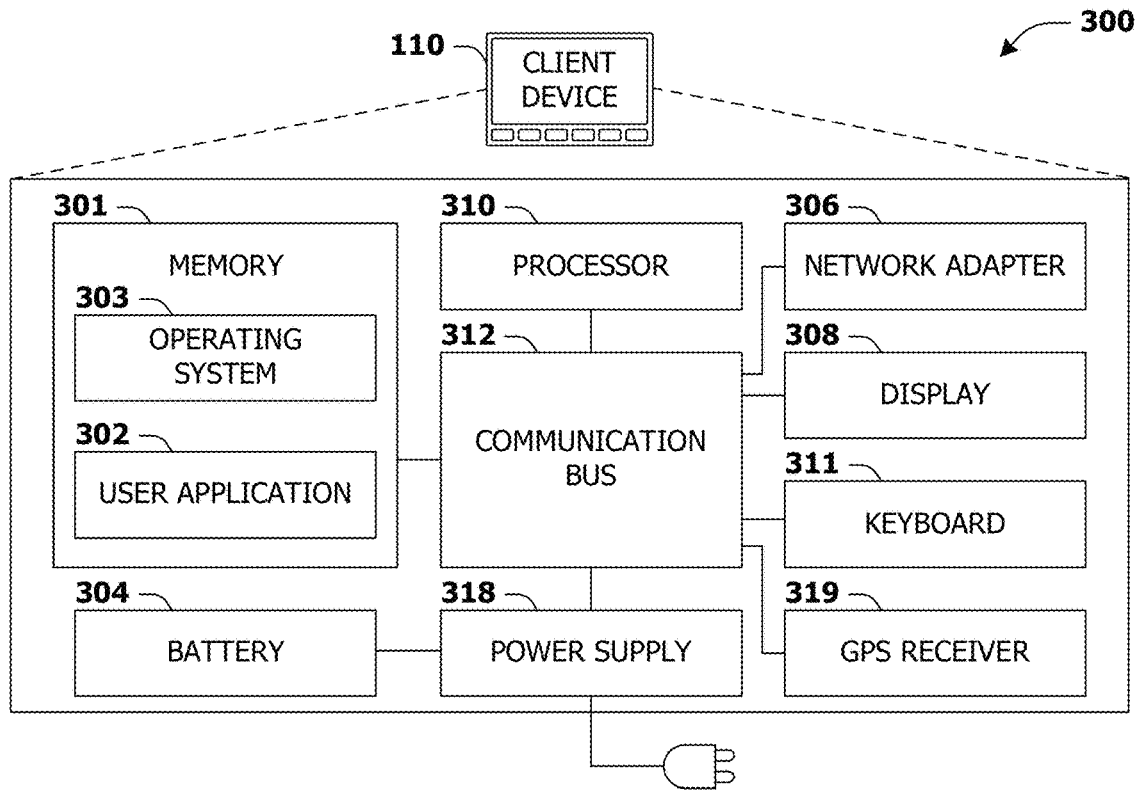
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more client devices, systems, and/or techniques for onboarding feature cues are provided. A feature cue (e.g., a cue, such as text, an image, audio instructions, a video, a modification to a user interface element of product, etc., to activate and/or utilize a new and/or existing feature of a product) may be generated using a feature cue template. The feature cue template may comprise a default set of parameters and/or design guidelines, such as user interface properties of a user interface through which the feature cue will be displayed. The feature cue may be provided to a scheduling component, comprising one or more existing feature cues. The scheduling component may determine whether a feature cue is eligible (e.g., the user has not viewed the feature cue, the user viewed the feature cue for a time below a sufficient time threshold, the user has not utilized a feature corresponding to the feature cue, etc.) or is ineligible (e.g., the user has utilized the feature, the user has interacted with the feature cue for a time exceeding the sufficient time threshold, the feature cue has reached an end of life date, etc.) for display to the user.

Eligible feature cues may be provided to a dispatching component. The dispatching component may determine a presentation hierarchy (e.g., an order of feature cue presentations, targeting actions of the user that trigger a related feature cue presentation to the user, etc.) based upon feature cue rules (e.g., how often and/or when feature cues may be presented to the user) and/or user parameters (e.g., based upon user behavior, past interactions of the user with the product, past feature cues, etc.). The presentation hierarchy may coordinate a presentation of related feature cues. Various presentation hierarchies may be generated (e.g., comprising one or more variations on feature cues for a particular feature, one or more feature cue presentation orders, etc.) and used to present feature cues to various users. User satisfaction metrics may be determined for the various presentation orders based upon user interactions with feature cues presented in the various presentation orders. A presentation order with a user engagement metric exceeding a threshold (e.g., a highest user satisfaction metric), but not other presentation orders, may be utilized to present feature cues to subsequent users.

The user's experience may be improved because relevant feature cues, for features of a product that are relevant to the user, may be provided to the user by coordinating related feature cues, indentifying eligible feature cues, and/or determining an improved presentation order. The feature cue rules may mitigate instances where the user is overwhelmed or annoyed with multiple feature cues being simultaneously presented and/or where multiple unrelated feature cues are presented in a short time span (e.g., 5 minutes or some other time span). Additionally, because feature cues may be generated using the feature cue template, a time to create a feature cue may be reduced (e.g., by about 70% or some other percentage). For example, the time to create the feature cue may be reduced by reducing a number of lines of code needed to generate the feature cue from about 200 lines of code to about 10 lines of code. In an example, an operating efficiency of a product provider of the product may be improved by generating and/or utilizing a presentation order with a high user engagement metric and/or by increasing an efficiency of feature cue generation by utilizing the feature cue template. For example, the user may be more likely to interact with a feature cue presented based upon the presentation hierarchy, thus reducing a number of times a feature cue is presented to the user and increasing feature interaction with the feature. Accordingly, computing resources may be reduced, efficiency for presenting feature cues and inducing feature utilization may be increased, and a user satisfaction may be improved.

Figure 4:
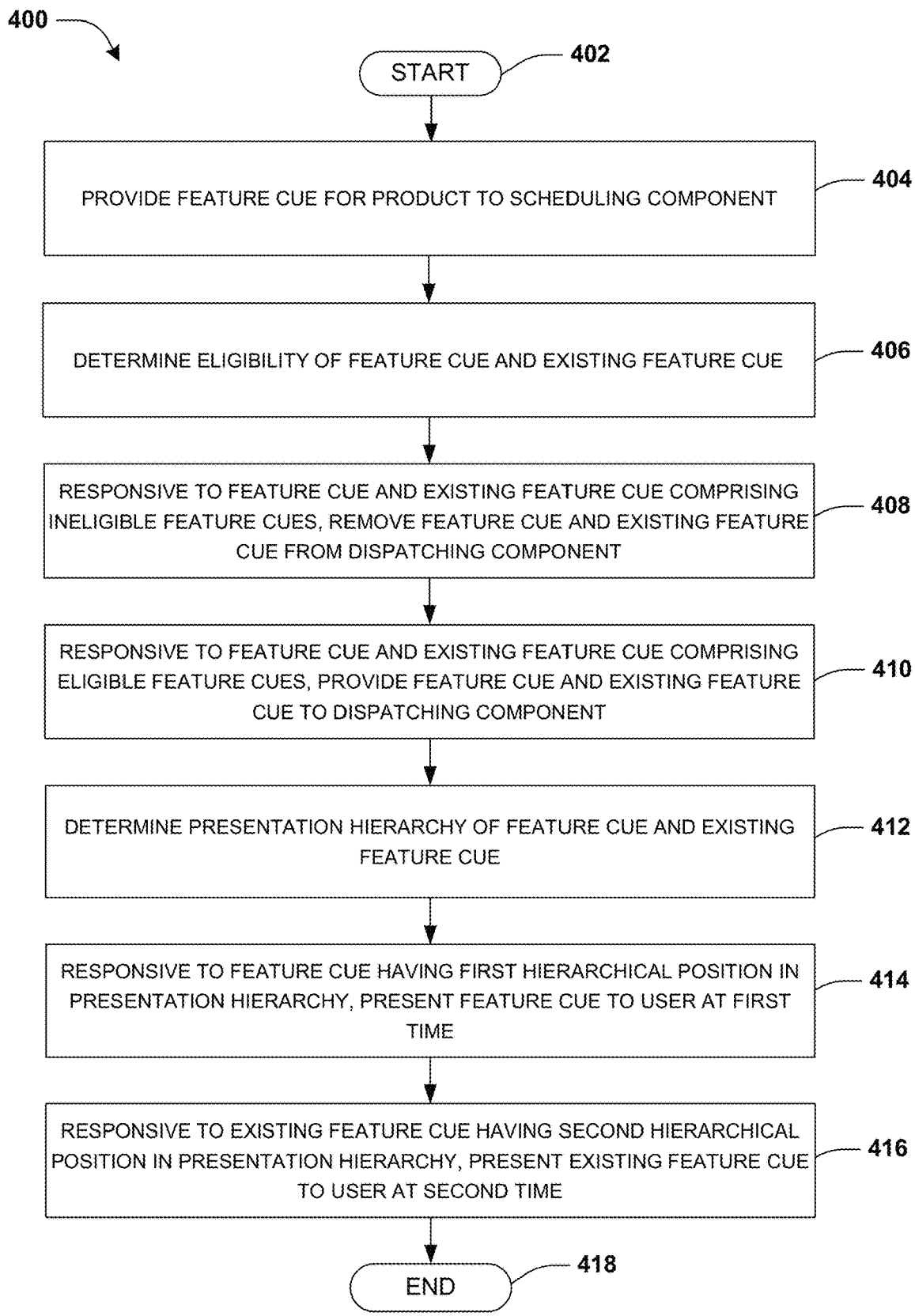
FIG. 4 is a flow chart illustrating an example method for onboarding feature cues.

An embodiment of onboarding feature cues is illustrated by an example method 400 of FIG. 4. At 402, the method 400 starts. At 404, a feature cue for a product may be provided to a scheduling component. The scheduling component may comprise an existing feature cue for the product. In an example, the feature cue and/or the existing feature cue may comprise a cue to interact with a feature of the product (e.g., a text messaging archiving feature of a text messaging application). The feature cue and/or the existing feature cue may be generated utilizing a feature cue template. The feature cue template may comprise a default set of parameters (e.g., how the feature cue is displayed, a feature cue area of interest, a feature cue end of life date, etc.) and design guidelines (e.g., optical and textual presentation elements of the feature cue).

At 406, an eligibility of the feature cue and the existing feature cue may be determined. The feature cue may be determined to comprise an eligible feature cue based upon the user having not previously viewed the feature cue, the user having viewed the feature cue for an a time below a sufficient time threshold (e.g., a cursory time period, such as less than 5 seconds of some other time period), the user having failed to utilize the feature corresponding to the feature cue, etc. The feature cue may be determined to comprise an ineligible feature cue based upon the user having utilized the feature corresponding to the feature cue (e.g., the user has archived past textual conversations using the text messaging application), the user having interacted with the feature cue (e.g., the user viewed the feature cue for a time period exceeding the sufficient time threshold), the feature cue having reached an end of life date (e.g., as designated by the feature cue, as determined by a ubiquity of the feature being utilized by users, etc.), etc. Responsive to the feature cue being relevant to a second product in a product family comprising the product, the eligibility of the feature cue may be based upon a user interaction with the feature cue while using the second product. For example, if the text messaging application is related to a webmail chat application, then the user viewing the feature cue, for the feature, on a client device hosting the webmail chat application may render the feature cue ineligible for presentation on the client device hosting the texting application. In this way, feature cue eligibility is determined based upon a likelihood that the user will find the feature cue useful.

At 408, responsive to the feature cue and the existing feature cue comprising ineligible feature cues, the feature cue and the existing feature cue may be removed from the scheduling component. In an example, responsive to the feature cue comprising an eligible feature cue and the existing feature cue comprising an ineligible feature cue, the existing feature cue, but not the feature cue, may be removed from the scheduling component. At 410, responsive to the feature cue and the existing feature cue comprising eligible feature cues, the feature cue and the existing feature cue may be provided to a dispatching component. The dispatching component may be configured to present feature cues to users of client devices hosting the product and/or related products.

At 412, a presentation hierarchy of the feature cue and the existing feature cue may be determined based upon feature cue rules and/or user parameters. In an example, the feature cue rules may comprise an assignment of a duration minimum between presentations of feature cues (e.g., no more than two feature cues may be presented to the user within an hour, or some other time period so that the user is not overwhelmed), an instruction for simultaneous presentations of feature cues (e.g., related feature cues may be presented at a same time), a coordination between related feature cues (e.g., feature cues that are related may be presented in a certain order based upon the relationship between the feature cues), and/or a maximum number of feature cues shown in a time period (e.g., 2 feature cues may be shown within an hour span, or some other number of feature cues).

In an example, the user parameters may comprise an interaction of the user with the product (e.g., the user may generate a targeting action within the product and/or related products), an interaction of the user with past feature cues (e.g., the user may prefer to interact with feature cues when the user first interacts with the product or after interacting with the product for a time span), a user demographic of the user (e.g., a user's age, gender, location, etc.), a user behavior of the user (e.g., a user's browsing history, a user interaction history with the product and/or related products, whether the user is a new user of the product or an existing user of the product, etc), a feature of the product with which the user interacts (e.g., feature cues related to features that the user interacts with more frequently may have a higher hierarchical position than feature cues not related to the features the user interacts with), and/or a second feature of the product and related products with which the user interacts (e.g., interaction with related products may be utilized to determine a hierarchical position of a second feature cue related to the second feature).

In an example, the targeting action may comprise the user interacting with a product feature of the product, the user entering a type specific keyword (e.g., identified as related to the feature), etc. In an example, the presentation hierarchy and/or the user parameters may be based upon a user satisfaction metric. The user engagement metric may be based upon the user's interaction with the feature cue and/or interaction with the feature. In an example, responsive to the presentation hierarchy having a lower user engagement metric than a second presentation hierarchy, presented to a second user of a second client device hosting the product, the second presentation hierarchy, but not the first presentation hierarchy, may be utilized to present feature cues to subsequent users. The second presentation hierarchy may be generated by altering the feature cue, the existing feature cue, the targeting attribute, and/or an order of presentation of the feature cue and the existing feature cue.

At 414, responsive to the feature cue having a first hierarchical position in the presentation hierarchy, the feature cue may be presented to the user at a first time. The first time may comprise a time relative to the user utilizing the product (e.g., 5 minutes after the user initiates a session with the product, or some other time). At 416, responsive to the existing feature cue having a second hierarchical position in the presentation hierarchy, presenting the existing feature cue at a second time. The first time and the second time may be determined by the feature cue rules. In another example, the presentation hierarchy may comprise hierarchical positions for targeting attributes (e.g., the feature cue is related to a targeting attribute). For example, responsive to the targeting attribute being identified, the feature cue related to the targeting attribute in the presentation hierarchy may be presented to the user at a third time dictated by the feature cue rules. At 418, the method 400 ends.

Figure 5A:
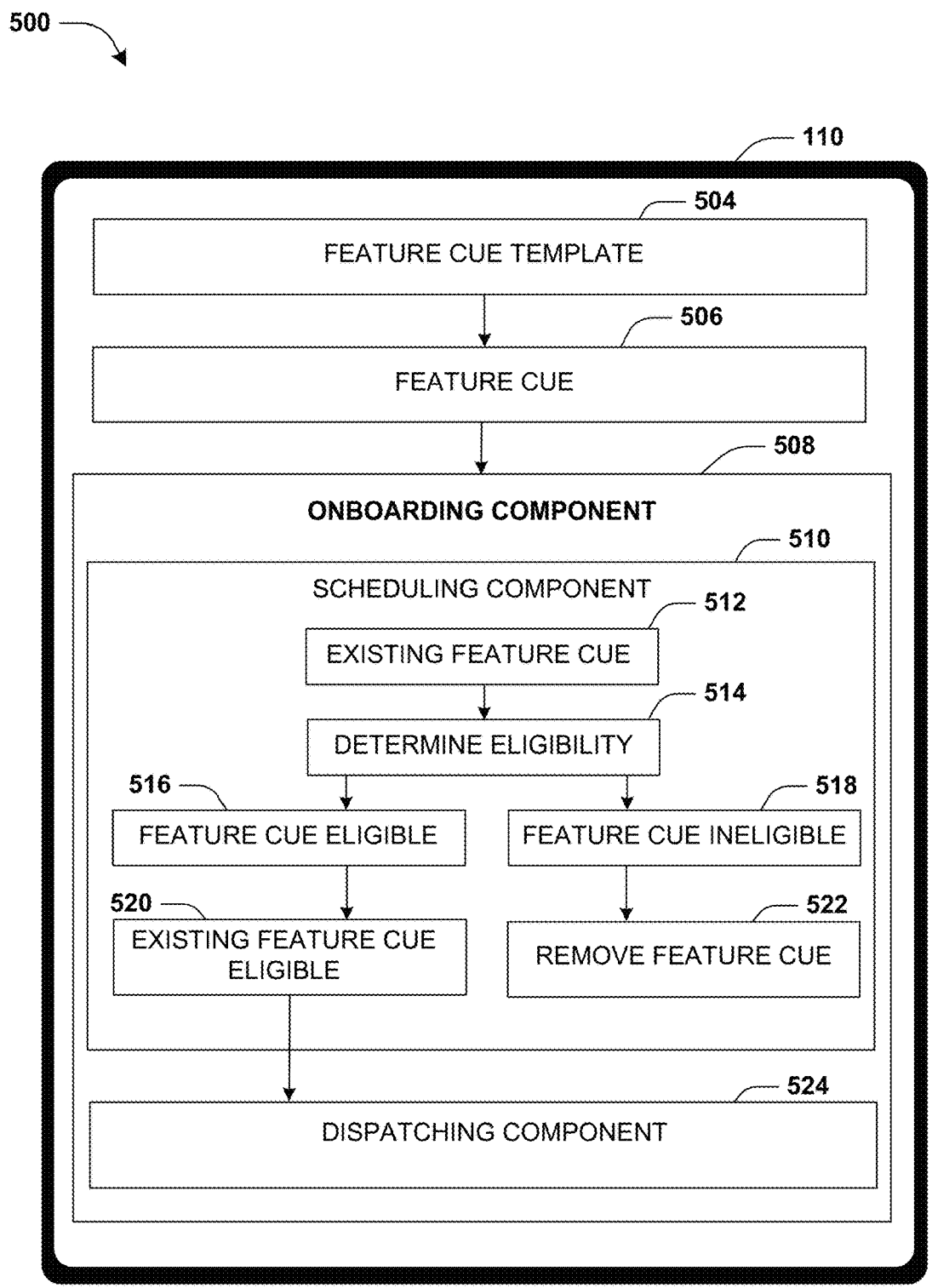
FIG. 5A is a component block diagram illustrating an example system for onboarding feature cues, where a feature cue eligibility is determined.
Figure 5B:
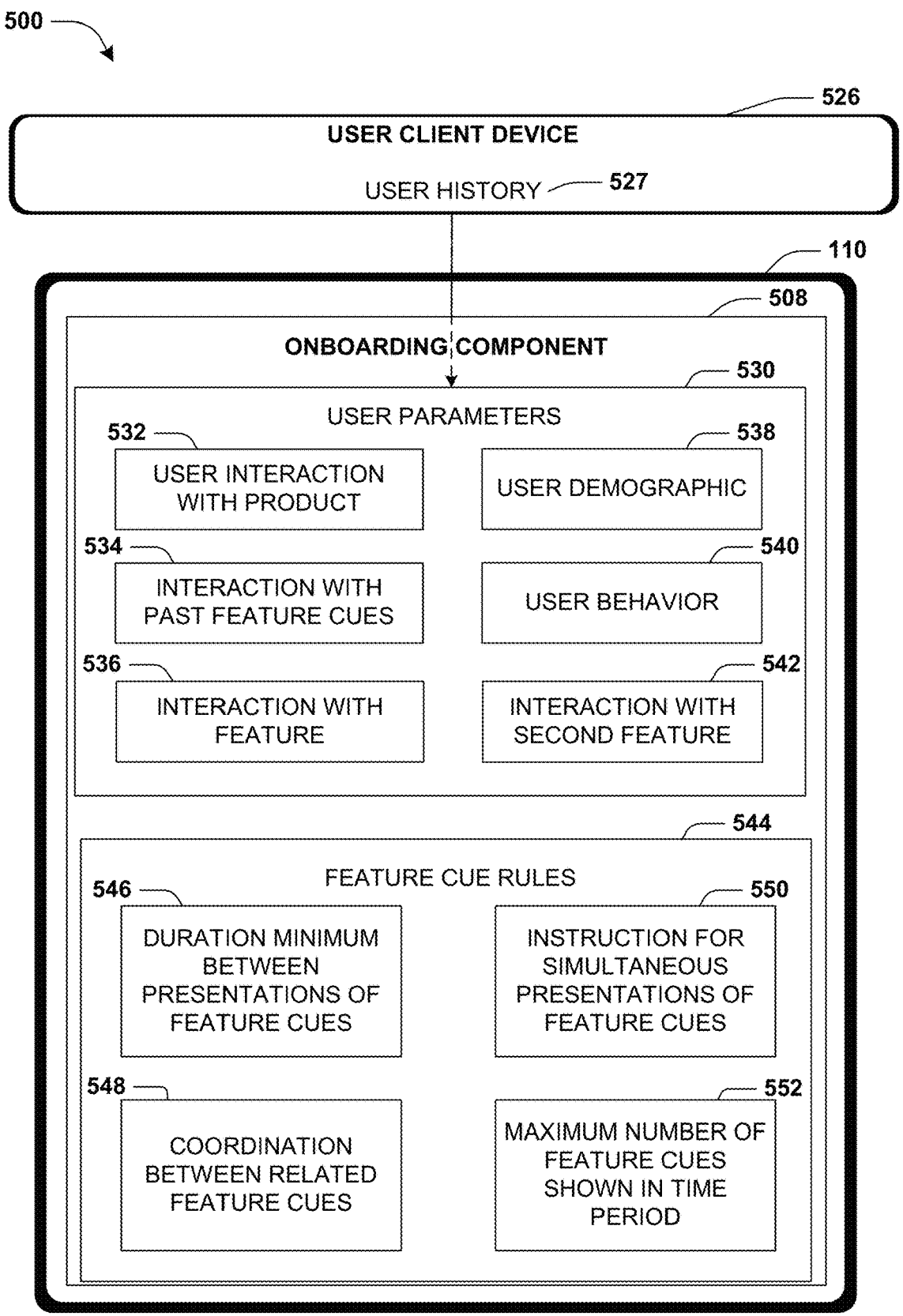
FIG. 5B is a component block diagram illustrating an example system for onboarding feature cues, where user parameters and feature cue rules are determined.
Figure 5C:
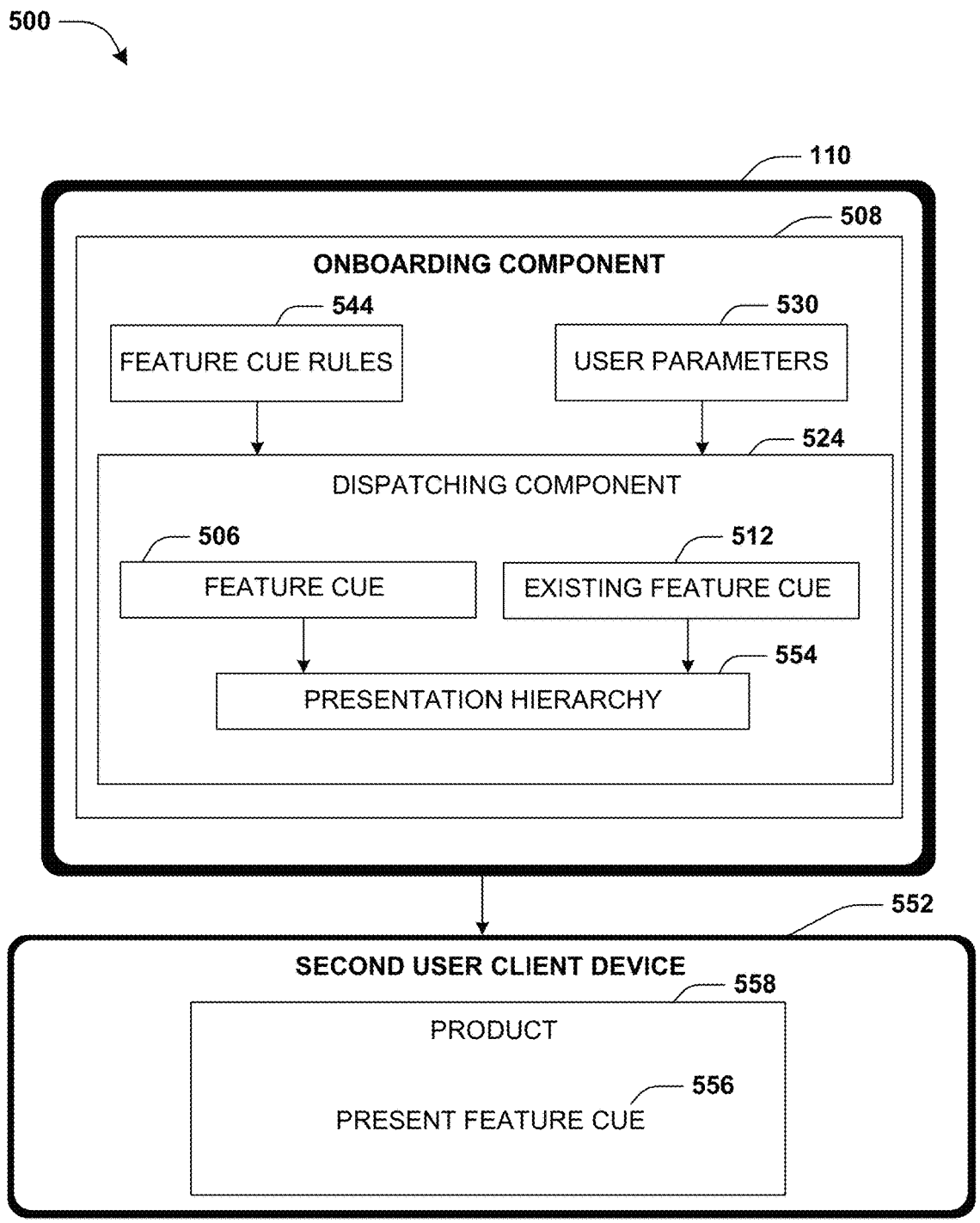
FIG. 5C is a component block diagram illustrating an example system for onboarding feature cues, where a feature cue is presented to a user.

FIGS. 5A-5C illustrate an example system 500 for onboarding feature cues utilizing an onboarding component 508 associated with a client device 110. A feature cue designer may generate a feature cue 506 for a product 558 utilizing a feature cue template 504. The feature cue 506 may be presented to a scheduling component 510 of the onboarding component 508. The scheduling component 510 may comprise an existing feature cue 512 (e.g., generated using the feature cue template 504). The scheduling component 510 may determine an eligibility 514 of the feature cue 506 and/or the existing feature cue 512. Responsive to the feature cue 506 being ineligible 518, the feature cue 506 may be removed 522 from the scheduling component 510. Responsive to the feature cue 506 being eligible 516 and the existing feature cue 512 being eligible 520, the feature cue 506 and the existing feature cue 512 may be provided to a dispatching component 524. The dispatching component 524 may be configured to present one or more feature cues to users.

FIG. 5B illustrates the onboarding component 508 determining user parameters 530 and identifying feature cue rules 544. The onboarding component 508 may determine the user parameters 530 based upon a user history 527 of the user of a user client device 526. The onboarding component 508 may parse the user history 527 into user interactions 532 with the product 558, user interactions with past feature cues 534, user interactions with features 536 of the product 558, a user demographic 538 of the user, user behavior 540 of the user, and/or user interaction with second features 542 of a second product related to the product 558. The onboarding component 508 may identify the feature cue rules 544 based upon rules from the feature cue 506 and/or the user parameters 530. The feature cue rules 544 may comprise a duration minimum 546 between presentations of feature cues, a coordination between related feature cues 548, instructions for simultaneous presentations of feature cues 550, and/or a maximum number 552 of feature cues presented to the user within a time period. In an example, the user parameters 530 may indicate that the user interacts with feature cues when the feature cue presentations have a duration minimum 546 between presentations of greater than one hour.

FIG. 5C illustrates the dispatching component 524 presenting the feature cue 506 to the user of a second user client device 552 hosting the product 558. The dispatching component 524 may determine a presentation hierarchy 554 based upon the feature cue rules 544 and/or the user parameters 530. The presentation hierarchy 554 may have the feature query 506 in a first hierarchical position, for presentation to the user at a first time, and the existing feature query 512 in a second hierarchical position, for presentation to the user at a second time. In an example, responsive to the user utilizing the product 558, the feature cue 506 may be presented 556 to the user at the first time. In another example, responsive to the user initiating a targeting action related to the existing feature cue 512, the existing feature cue 512 may be moved into the first hierarchical position and presented at the first time.

Figure 6:
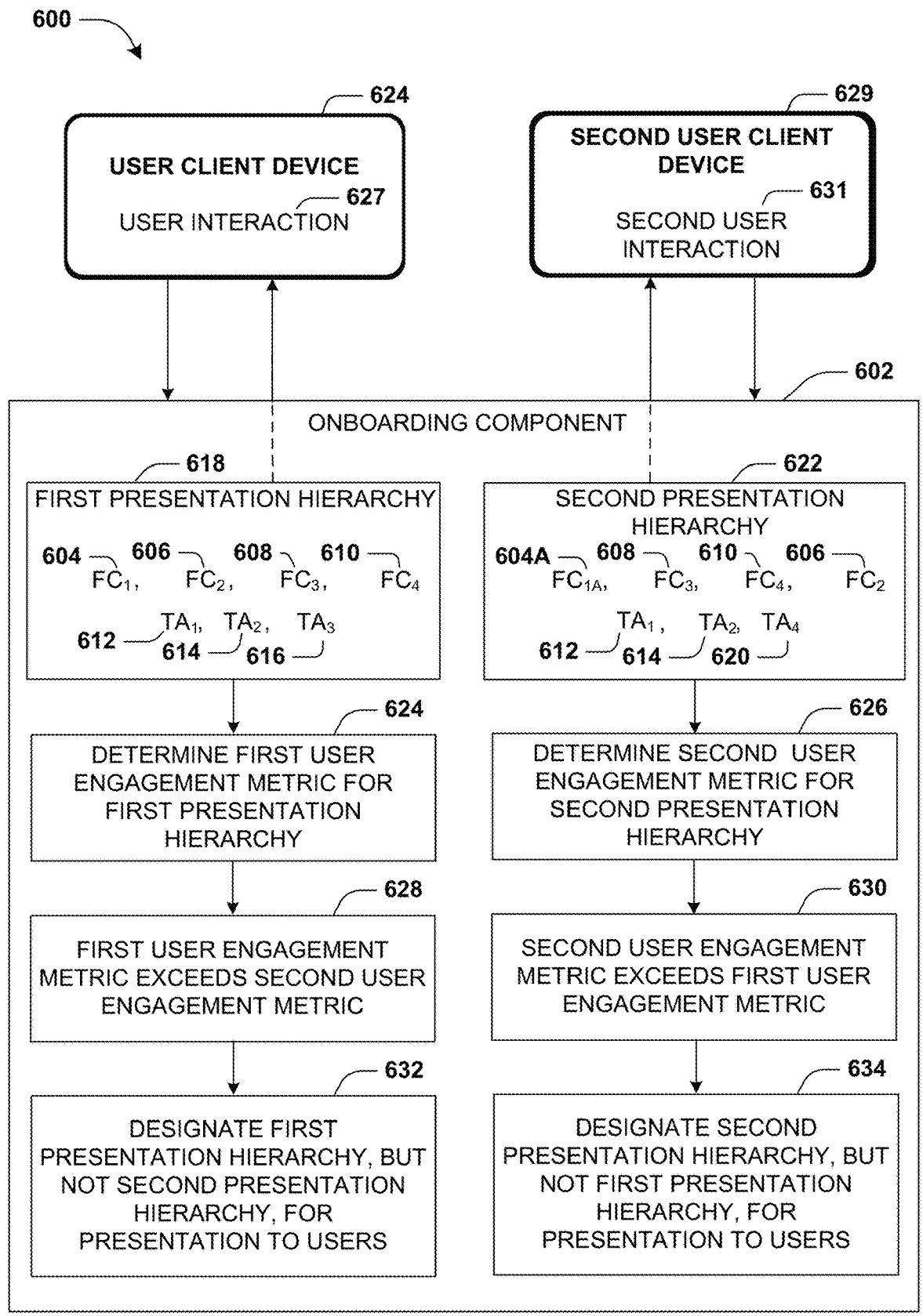
FIG. 6 is a component block diagram illustrating an example system for onboarding feature cues, where a presentation hierarchy is designated.

FIG. 6 illustrates an example system 600 for identifying a presentation hierarchy having a highest user satisfaction metric. An onboarding component 602 may determine a first presentation hierarchy 618 and a second presentation hierarchy 622. The first presentation hierarchy 618 may comprise, in a hierarchical position order, a first feature cue $FC_1$ 604, a second feature cue $FC_2$ 606, a third feature cue $FC_3$ 608, a fourth feature cue $FC_4$ 610, a first targeting action $TA_1$ 612, a second targeting action $TA_2$ 614, and/or a third targeting action $TA_3$ 616. For example, the first feature cue $FC_1$ 604 may be in a first hierarchical position (e.g., for presentation to a first user of a user client device 624 at a first time), the second feature cue $FC_2$ 606 may be in a second hierarchical position (e.g., for presentation to the user at a second time after the first time), etc. In an example, the first targeting action $TA_1$ 612 may be related to the first feature cue $FC_1$ 604, such that the user may be presented with the first feature cue $FC_1$ 604 responsive to an occurrence of the first targeting action $TA_1$ 612. The second targeting action $TA_2$ 614 may be related to the second feature cue $FC_2$ 606, the third targeting action $TA_3$ 616 may be related to the third feature cue $FC_3$ 608, etc. The feature cues may be presented to the first user of the user client device 624 based upon the first presentation hierarchy 618. A user interaction 627 of the user with the feature cues, presented based upon the first presentation hierarchy 618, may be provided to the onboarding component 602.

The second presentation hierarchy 622 may comprise, in a second hierarchical position order, a first altered feature cue $FC_{1a}$ 604A (e.g., the first altered feature cue $FC_{1a}$ 604A may correspond to a same feature as the first feature cue $FC_1$ 604), the third feature cue $FC_3$ 608, the fourth feature cue $FC_4$ 610, the second feature cue $FC_2$ 606, the first targeting action $TA_1$ 612, the second targeting action $TA_2$ 614, and/or a fourth targeting action $TA_4$ 620. For example, the first altered feature cue $FC_{1a}$ 604A may be in the first hierarchical position, the third feature cue $FC_3$ 608 may be in the second hierarchical position, etc. In an example, the first targeting action $TA_1$ 612 may be related to the first altered feature cue $FC_{1a}$ 604A, such that a second user may be presented with the first altered feature cue $FC_{1a}$ 604A responsive to an occurrence of the first targeting action $TA_1$ 612. In an example, the second targeting action $TA_2$ 614 may be related to the second feature cue $FC_2$ 606, the fourth targeting action $TA_4$ 620 may be related to the fourth feature cue $FC_4$ 610, etc. The feature cues may be presented to the second user of a second user client device 629 based upon the second presentation hierarchy 622. A second user interaction 631 of the second user with the feature cues, presented based upon the second presentation hierarchy 622, may be provided to the onboarding component 602.

In an example, a first user engagement metric 624 may be determined for the first presentation hierarchy 618 based upon the user interaction 627. A second user engagement metric 626 may be determined for the second presentation hierarchy 622 based upon the second user interaction 631. Responsive to the first user engagement metric 624 exceeding 628 the second user engagement metric 626, the first presentation hierarchy 618, but not the second presentation hierarchy 622, may be designated 632 for presentation to subsequent users. Responsive to the second user engagement metric 626 exceeding 630 the first user engagement metric 624, the second presentation hierarchy 622, but not the first presentation hierarchy 618, may be designated 634 for presentation to the subsequent users. In another example, multiple presentation hierarchies may be presented to multiple users, and a presentation hierarchy having a highest user satisfaction may be designated for presentation to the subsequent users. In another example, the multiple presentation hierarchies may have multiple targeting actions corresponding to a feature cue, and a targeting action having a highest user engagement metric may be associated with the feature cue.

Figure 7:
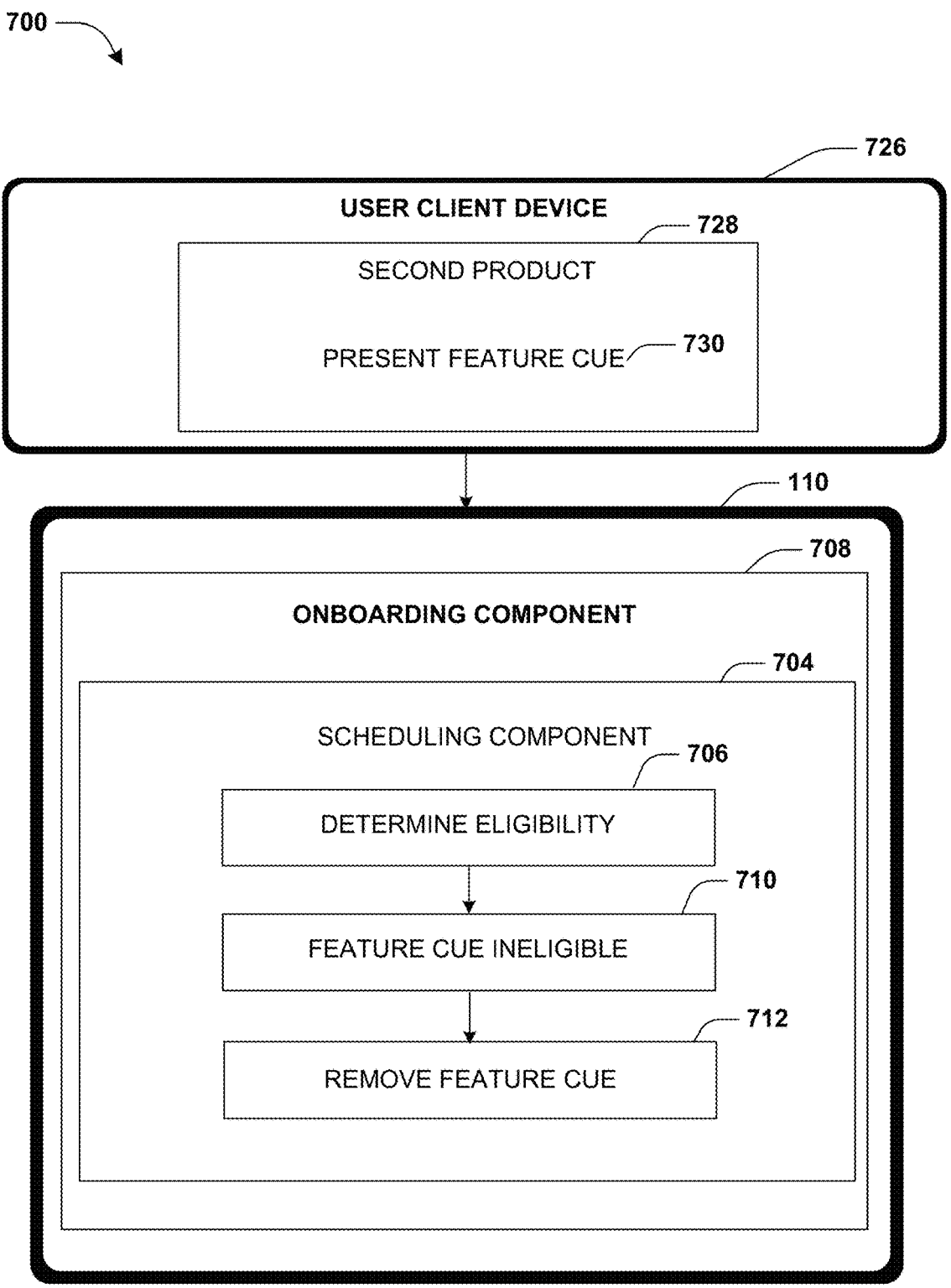
FIG. 7 is a component block diagram illustrating an example system for onboarding feature cues, where a feature cue is presented in a second product relating to a product.

FIG. 7 illustrates an example system 700 for determining eligibility 706 of a feature cue for a product. A user of a user client device 726 may utilize a second product 728 related to the product. For example, the second product 728 and the product may have one or more features in common. The feature cue may be presented 730 to the user while the user is utilizing the second product 728. The feature cue may be provided to a scheduling component 704 of an onboarding component 708 on a client device 110. The scheduling component 704 may determine the eligibility of the feature cue. Responsive to the feature cue having been presented to the user utilizing the second product 728 (e.g., where the user viewed the feature cue for a non-cursory duration) and/or the user having utilized a feature, corresponding to the feature cue, of the second product 728, the scheduling component 704 may determine that the feature cue is ineligible 710 (e.g., the user may already understand the feature). Responsive to the feature cue being ineligible 710, the feature cue may be removed 712 from the scheduling component 704.

Figure 8:
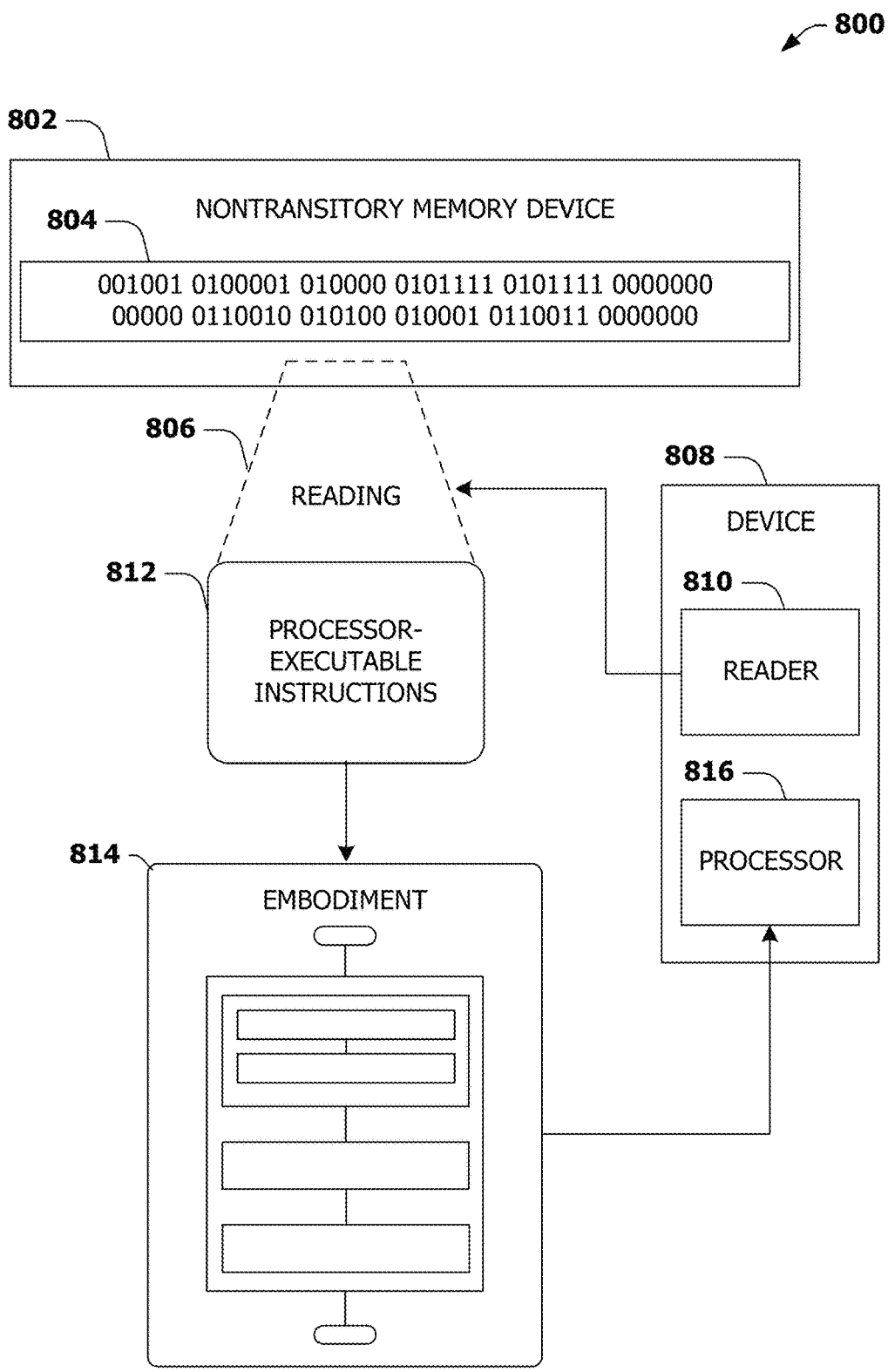
FIG. 8 is an illustration of a scenario featuring an example nontransitory memory device in accordance with one or more of the provisions set forth herein.

FIG. 8 is an illustration of a scenario 800 involving an example nontransitory memory device 802. The nontransitory memory device 802 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random-dom access memory (SDRAM) technologies), a platter of a hard disk drive, a flash memory device, or a magnetic or optical disc (such as a CD, DVD, or floppy disk). The example nontransitory memory device 802 stores computer-readable data 804 that, when subjected to reading 806 by a reader 810 of a device 808 (e.g., a read head of a hard disk drive, or a read operation invoked on a solid-state storage device), express processor-executable instructions 812. In some embodiments, the processor-executable instructions, when executed on a processor 816 of the device 808, are configured to perform a method, such as at least some of the example method 400 of FIG. 4, for example. In some embodiments, the processor-executable instructions, when executed on the processor 716 of the device 708, are configured to implement a system, such as at least some of the example system 500 of FIGS. 5A-5C, and/or at least some of at least some of the example system 600 of FIG. 6, and/or at least some of at least some of the example system 700 of FIG. 7, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of onboarding feature cues, comprising:
providing a feature cue for a product to a scheduling component of a first device, the scheduling component comprising a second feature cue for the product wherein the feature cue comprises an indication of a first feature of the product, wherein the second feature cue comprises an indication of a second feature of the product;
determining at least one of a user behavior of a user or a user interaction of the user with the product;
determining, based upon at least one of the user behavior or the user interaction, an eligibility of the feature cue and the second feature cue based upon at least one of a determination of whether the user utilized the first feature of the product corresponding to the feature cue or a determination of whether the user utilized the second feature of the product corresponding to the second feature cue;
responsive to the feature cue and the second feature cue comprising eligible feature cues, providing the feature cue and the second feature cue to a dispatching component of the first device;
determining a presentation hierarchy of the feature cue and the second feature cue based upon feature cue rules and user parameters;
responsive to the feature cue having a first hierarchical position in the presentation hierarchy, presenting the feature cue to the user, through a second device hosting the product, at a first time; and
responsive to the second feature cue having a second hierarchical position in the presentation hierarchy, presenting the second feature cue to the user, through the second device, at a second time, the first time and the second time determined by the feature cue rules.

2. The method of claim 1, further comprising:
determining that the feature cue comprises an eligible feature cue based upon at least one of the user having not previously viewed the feature cue, the user having viewed the feature cue for a time below a sufficient time threshold, or the user having failed to utilize the first feature corresponding to the feature cue.

3. The method of claim 1, further comprising:
determining that the feature cue comprises an ineligible feature cue based upon at least one of the user having utilized the first feature corresponding to the feature cue, the user having interacted with the feature cue for a time exceeding a sufficient time threshold, or the feature cue having reached an end of life date.

4. The method of claim 1, further comprising:
responsive to the feature cue being relevant to a second product in a product family comprising the product, determining the eligibility of the feature cue based upon at least one user interaction with the feature cue while using the second product.

5. The method of claim 1, the feature cue rules further comprising an assignment of at least one of:
a duration minimum between presentations of feature cues, an instruction for simultaneous presentations of feature cues, a coordination between related feature cues, or a maximum number of feature cues shown in a time period.

6. The method of claim 1, the user parameters based upon at least one of:
an interaction of the user with the product, an interaction of the user with past feature cues, a user demographic of the user, at least one user behavior of the user, a feature of the product with which the user interacts, or a third feature of the product and related products with which the user interacts.

7. The method of claim 1, further comprising:
generating the feature cue utilizing a feature cue template.

8. The method of claim 7, the feature cue template comprising a default set of parameters and design guidelines.

9. The method of claim 1, further comprising altering at least one of:
the presentation hierarchy or the user parameters based upon a user engagement metric corresponding to least one of at least one user interaction with the feature cue or at least one user interaction with a feature depicted by the feature cue.

10. The method of claim 1, further comprising:
altering the feature cue based upon a user engagement metric corresponding to at least one of user interaction with the feature cue or user interaction with a feature depicted by the feature cue.

11. The method of claim 1, further comprising:
presenting the feature cue to the user in response to identifying a targeting action of the user, the targeting action comprised in the presentation hierarchy.

12. The method of claim 11, further comprising:
identifying a type specific keyword to comprise the targeting action.

13. The method of claim 11, further comprising:
altering the targeting action based upon a user engagement metric corresponding to at least one user interaction with the feature cue presented responsive to the targeting action.

14. A device for onboarding feature cues, the device comprising:
a processor; and
a memory storing instructions that, when executed on the processor, provide a system comprising:
an onboarding component configured to:
provide a feature cue for a product to a scheduling component, the scheduling component comprising a second feature cue for the product;
determine at least one of a user behavior of a user or a user interaction of the user with the product;
determine, based upon at least one of the user behavior or the user interaction, an eligibility of the feature cue and the second feature cue based upon at least one of a determination of whether the user utilized a first feature of the product corresponding to the feature cue or a determination of whether the user utilized a second feature of the product corresponding to the second feature cue;
responsive to the feature cue and the second feature cue comprising eligible feature cues, provide the feature cue and the second feature cue to a dispatching component configured to dispatch one or more feature cues to a first user and a second user;
present the feature cue and the second feature cue to the first user, of a first user client device hosting the product, based upon a first presentation hierarchy;
determine a first user interaction, of the first user client device, with the feature cue and the second feature cue;
determine a first user engagement metric for the first presentation hierarchy based upon the first user interaction with the feature cue and the second feature cue;
present the feature cue and the second feature cue to the second user, of a second user client device hosting the product, based upon a second presentation hierarchy;
determine a second user interaction, of the second user client device, with the feature cue and the second feature cue;
determine a second user engagement metric for the second presentation hierarchy based upon the second user interaction with the feature cue and the second feature cue; and
responsive to the first user engagement metric exceeding the second user engagement metric, designate the first presentation hierarchy, but not the second presentation hierarchy, for subsequent presentation to one or more other users.

15. The device of claim 14, the onboarding component further configured to:
responsive to the second user engagement metric exceeding the first user engagement metric, designate the second presentation hierarchy, but not the first presentation hierarchy, for subsequent presentation to users.

16. The device of claim 14, the onboarding component further configured to at least one of:
determine that the feature cue comprises an eligible feature cue based upon at least one of:
the user having not previously viewed the feature cue, the user having viewed the feature cue for a time below a sufficient time threshold, or the user having failed to utilize a feature corresponding to the feature cue; or
determine that the feature cue comprises an ineligible feature cue based upon at least one of:
the user having utilized the feature corresponding to the feature cue, the user having interacted with the feature cue for a time exceeding the sufficient time threshold, or the feature cue having reached an end of life date.

17. The device of claim 14, the onboarding component further configured to assign at least one of:
a duration minimum between presentations of feature cues, an instruction for simultaneous presentations of feature cues, a coordination between related feature cues, or a maximum number of feature cues shown in a time period.

18. The device of claim 14, wherein at least one of the first presentation hierarchy or the second presentation hierarchy is based upon user parameters corresponding to at least one of:
an interaction of the user with the product, an interaction of the user with past feature cues, a user demographic of the user, at least one user behavior of the user, a feature of the product with which the user interacts, or a third feature of the product and related products with which the user interacts.

19. The device of claim 14, the onboarding component further configured to:
determine at least one of the first presentation hierarchy or the second presentation hierarchy, the feature cue, and a targeting action that induces presentation of the feature cue based upon a user satisfaction metric, at least one of the first user engagement metric or the second user engagement metric based upon at least one of at least one user interaction with the feature cue or at least one user interaction with a feature depicted by the feature cue.

20. A computer readable medium comprising instructions which when executed perform a method for onboarding feature cues, comprising:
generating, via a first device, a feature cue, for a product, utilizing a feature cue template;
providing the feature cue to a scheduling component of the first device, the scheduling component comprising a second feature cue for the product;

determining at least one of a user behavior of a user or a user interaction of the user with the product;

determining, based upon at least one of the user behavior or the user interaction, an eligibility of the feature cue and the second feature cue based upon at least one of a determination of whether the user utilized a first feature of the product corresponding to the feature cue or a determination of whether the user utilized a second feature of the product corresponding to the second feature cue;

responsive to the feature cue and the second feature cue comprising eligible feature cues, providing the feature cue and the second feature cue to a dispatching component of the first device;

responsive to the feature cue and the second feature cue comprising ineligible feature cues, removing the feature cue and the second feature cue from the scheduling component;

determining a presentation hierarchy of the feature cue and the second feature cue based upon feature cue rules and user parameters;

responsive to the feature cue having a first hierarchical position in the presentation hierarchy, presenting the feature cue to the user, through a second device hosting the product, at a first time; and responsive to the second feature cue having a second hierarchical position in the presentation hierarchy, presenting the second feature cue to the user, through the second device, at a second time, the first time and the second time determined by the feature cue rules.

* * * * *